United States Patent
Cheong et al.

(10) Patent No.: US 10,141,813 B2
(45) Date of Patent: Nov. 27, 2018

(54) POWER STRUT

(71) Applicant: Johnson Electric S.A., Murten (CH)

(72) Inventors: Man Iao Cheong, Hong Kong (CN); Dennis Francis Gorosin, Hong Kong (CN); Xue Song Li, Shenzhen (CN); Xiao Fu Gan, Shenzhen (CN); Hui Min Xiong, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 315 days.

(21) Appl. No.: 14/713,495

(22) Filed: May 15, 2015

(65) Prior Publication Data

US 2015/0333591 A1    Nov. 19, 2015

(30) Foreign Application Priority Data

May 15, 2014   (CN) .......................... 2014 1 0206864

(51) Int. Cl.
| | |
|---|---|
| *H02K 7/06* | (2006.01) |
| *H02K 1/17* | (2006.01) |
| *H02K 1/22* | (2006.01) |
| *H02K 5/16* | (2006.01) |
| *E05F 15/622* | (2015.01) |
| *H02K 5/22* | (2006.01) |
| *H02K 7/08* | (2006.01) |
| *H02K 7/116* | (2006.01) |

(Continued)

(52) U.S. Cl.
CPC ............. *H02K 7/06* (2013.01); *E05F 15/622* (2015.01); *H02K 1/17* (2013.01); *H02K 1/22* (2013.01); *H02K 5/163* (2013.01); *H02K 5/22* (2013.01); *H02K 7/083* (2013.01); *H02K 7/116* (2013.01); *H02K 7/14* (2013.01); *H02K 13/006* (2013.01); *H02K 13/10* (2013.01); *E05Y 2900/546* (2013.01)

(58) Field of Classification Search
CPC .. H02K 1/17; H02K 1/18; H02K 1/22; H02K 7/06; H02K 7/083; H02K 7/14; H02K 7/116
USPC ........... 310/71, 83, 89, 239, 154.12, 154.13; 74/89.23
IPC ................................................. H02K 1/17,1/22
See application file for complete search history.

(56) References Cited

U.S. PATENT DOCUMENTS

| | | | |
|---|---|---|---|
| 4,851,729 A | 7/1989 | Baines | ...................... H02K 1/17 |
| | | | 310/154.13 |
| 5,104,114 A | 4/1992 | Gillmann | ............... B65H 31/06 |
| | | | 271/181 |

(Continued)

FOREIGN PATENT DOCUMENTS

CN          101967930 A     2/2011

*Primary Examiner* — John K Kim
(74) *Attorney, Agent, or Firm* — Muncy, Geissler, Olds & Lowe, PC (57) ABSTRACT

A power strut for a vehicle lift gate, has a driver sleeve, a lead screw sleeve, a lead screw and a spring mounted in the lead screw sleeve. A gear reduction mechanism and a motor assembly are mounted in the driver sleeve for driving the lead screw. The motor assembly has a magnet mounting bracket fixed to the driver sleeve and a rotor disposed in the magnet mounting bracket. An end cover and multiple permanent magnets are fixed to the magnet mounting bracket. Each of the magnets is positioned between a corresponding pair of adjacent connecting portions and contacts an inner surface of the driver sleeve, thereby the driver sleeve provides a magnetic path between the magnets.

14 Claims, 5 Drawing Sheets

(51) Int. Cl.
*H02K 7/14* (2006.01)
*H02K 13/00* (2006.01)
*H02K 13/10* (2006.01)

(56) References Cited

U.S. PATENT DOCUMENTS

| | | | | |
|---|---|---|---|---|
| 6,060,799 A | 5/2000 | McManus | ............... | H02K 1/17 29/596 |
| 6,516,567 B1* | 2/2003 | Stone | ................... | E05F 15/622 296/55 |
| 7,070,226 B2* | 7/2006 | Cleland | ................ | E05F 1/1091 296/146.8 |
| 7,071,644 B2* | 7/2006 | Kawanobe | ............. | E05F 15/40 318/280 |
| 7,665,794 B2* | 2/2010 | Kachouh | ............ | F16H 25/2056 296/146.3 |
| 9,080,366 B2* | 7/2015 | Schiegel | ............... | E05F 15/622 |
| 9,605,464 B2* | 3/2017 | Kessler | ................... | H02K 1/17 |
| 9,845,631 B2* | 12/2017 | Eggeling | ............... | E05F 15/611 |
| 2004/0135439 A1* | 7/2004 | White | .................... | F04D 29/668 310/51 |
| 2007/0062119 A1 | 3/2007 | Ritter | ..................... | F16H 25/20 49/343 |
| 2011/0037334 A1* | 2/2011 | Lay | ......................... | H02K 1/17 310/154.08 |
| 2011/0095630 A1* | 4/2011 | Jiang | ..................... | H02K 5/148 310/72 |
| 2011/0156545 A1 | 6/2011 | Wen | ..................... | H02K 23/66 310/68 B |
| 2013/0092377 A1 | 4/2013 | Leugemors | .......... | E21B 21/062 166/292 |
| 2015/0333591 A1* | 11/2015 | Cheong | ................. | H02K 5/163 310/71 |

* cited by examiner

POWER STRUT

CROSS REFERENCE TO RELATED APPLICATIONS

This non-provisional patent application claims priority under 35 U.S.C. § 119(a) from Patent Application No. 201410206864.9 filed in The People's Republic of China on May 15, 2014, the entire contents of which are hereby incorporated by reference.

FIELD OF THE INVENTION

This invention relates to an electric actuator and in particular, to a power strut as used for raising and lowering a hatch door of a vehicle.

BACKGROUND OF THE INVENTION

Some vehicles have a hatch door for access to the rear of the vehicle. This is a door which is raised and lowered by swinging or pivoting in the vertical direction and is also known as a lift gate as it is commonly used in vans and light goods vehicles to provide access to the cargo area of the vehicle. Manually operated lift gates have one or two struts with provide a spring force to assist opening. Power struts have an electric motor used to extend and retract the strut to open and close the lift gate.

China Patent Application No. 201010288083.0, discloses an electric drive mechanism for a power strut. This drive mechanism includes a driver sleeve and a lead screw sleeve. An electric motor and a planetary gear train are mounted in the driver sleeve. A lead screw and a spring are mounted in the lead screw sleeve. The electric motor includes a stator and a rotor. The stator includes an outer housing, permanent magnets mounted to an inner surface of the outer housing, and end covers disposed at opposite ends of the outer housing. The rotor includes a shaft, and a rotor core and a commutator fixed to the shaft. The shaft is supported by bearings fixed to the end covers, such that the rotor can rotate relative to the stator.

A shortcoming of the above configuration is that the diameter of the outer housing of the stator is limited to the inner diameter of the driver sleeve, which in turn, limits the diameter of the rotor. This places a limitation on the output power of the motor.

SUMMARY OF THE INVENTION

Hence there is a desire for a power strut with a motor having a rotor with a larger diameter with respect to the diameter of the power strut.

Accordingly, in one aspect thereof, the present invention provides a power strut for a vehicle lift gate, comprising a driver sleeve, a lead screw sleeve, a lead screw and a spring mounted in the lead screw sleeve, and a gear reduction mechanism mounted in the driver sleeve for driving the lead screw, and a motor assembly connected with the gear reduction mechanism and mounted in the driver sleeve, wherein the motor assembly comprises a magnet mounting bracket fixed to the driver sleeve, an end cover and multiple permanent magnets fixed to the magnet mounting bracket, and a rotor rotatably disposed in the magnet mounting bracket, the magnet mounting bracket comprises a closed annular portion, an open annular portion and multiple connecting portions extending between the two annular portions, the open annular portion having a through hole for allowing the rotor to pass there through, the end cover is mounted to the open annular portion, each of the magnets is positioned between a corresponding pair of adjacent connecting portions and contacts an inner surface of the driver sleeve, thereby the driver sleeve provides a magnetic path between the magnets, and the rotor comprises a shaft, and a rotor core and a commutator fixed to the shaft, the rotor core is disposed within the magnet mounting bracket and surrounded by the magnets, and is supported by bearings mounted on the end cover and the closed annular portion.

Preferably, a recessed mounting portion is formed in an outer periphery of the magnet mounting bracket and the end cover, and the driver sleeve forms a mounting portion interference-fitting with the recessed mounting portion to prevent relative movement between the magnet mounting bracket and the driver sleeve.

Preferably, the magnets are fixed to the magnet mounting bracket using an insert molding method.

Preferably, the open annular portion comprises a protrusion extending in an axial direction, and the end cover comprises a corresponding recess receiving the protrusion to prevent relative movement between the end cover and the magnet mounting bracket.

Preferably, the closed annular portion comprises a second end cover.

Preferably, a brush mounting structure for mounting brushes is integrally formed with the end cover.

Preferably, the end cover comprises an inductor and power terminals that extend in an axial direction of the driver sleeve.

Alternatively, a brush mounting structure for mounting brushes is integrally formed with the closed annular portion.

Preferably, the closed annular portion comprises an inductor and power terminals that extend in an axial direction of the driver sleeve.

Preferably, each of the magnets is retained against the inner surface of the driver sleeve by circumferential sides of the connecting portions.

Preferably, further including a first connecting head at one end of the driver sleeve for connecting to a vehicle body, a second connecting head at one end of the lead screw sleeve for connecting to the lift gate, and a nut engaged with the lead screw, the nut being connected to the second connecting head through a connecting member.

Preferably, one end of the spring abuts against an end of the driver sleeve remote from the first connecting head, and another end of the spring abuts against one of the second connecting head, the connecting member and the lead screw sleeve.

In view of the foregoing, the permanent magnets of the motor assembly fit against the inner surface of the driver sleeve, and the permanent magnets and the sleeve cooperatively form the closed magnetic loop. This eliminates the magnetically conductive outer housing of the motor, thus simplifying the structure and reducing the fabrication cost. In addition, because of the elimination of the motor housing, the radial space available in the driver sleeve is increased, which enables a greater outer diameter of the motor rotor and hence increases the power of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
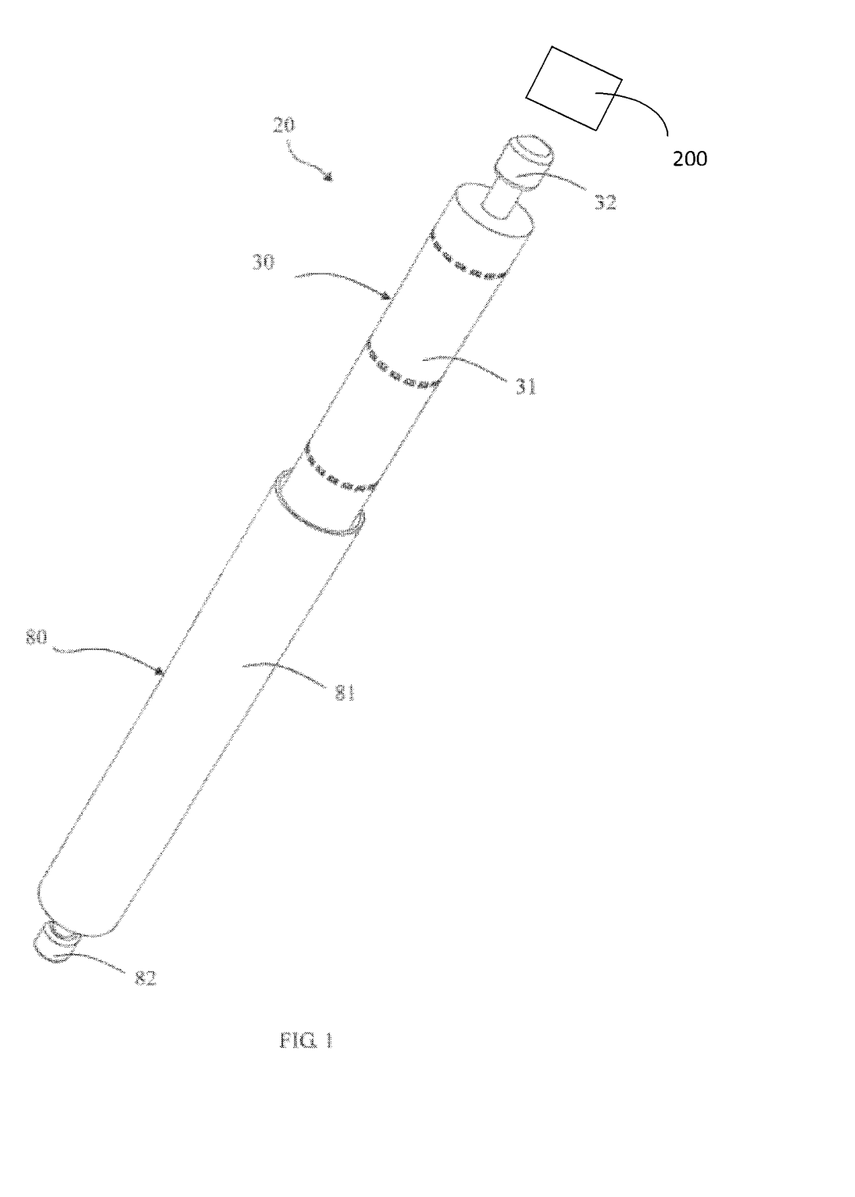
FIG. 1 is a perspective view of power strut according to the preferred embodiment of the present invention.
Figure 2:
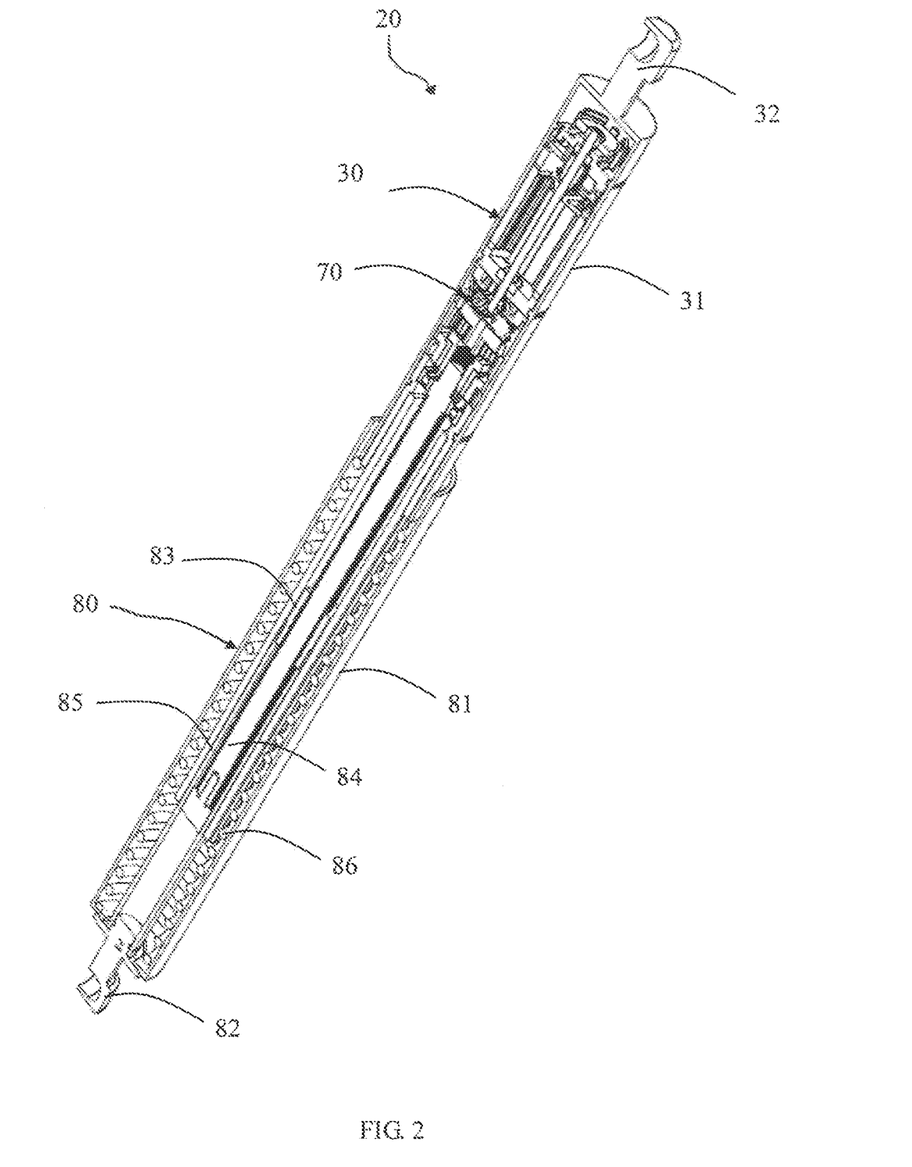
FIG. 2 is a sectional view of the power strut of FIG. 1.
Figure 3:
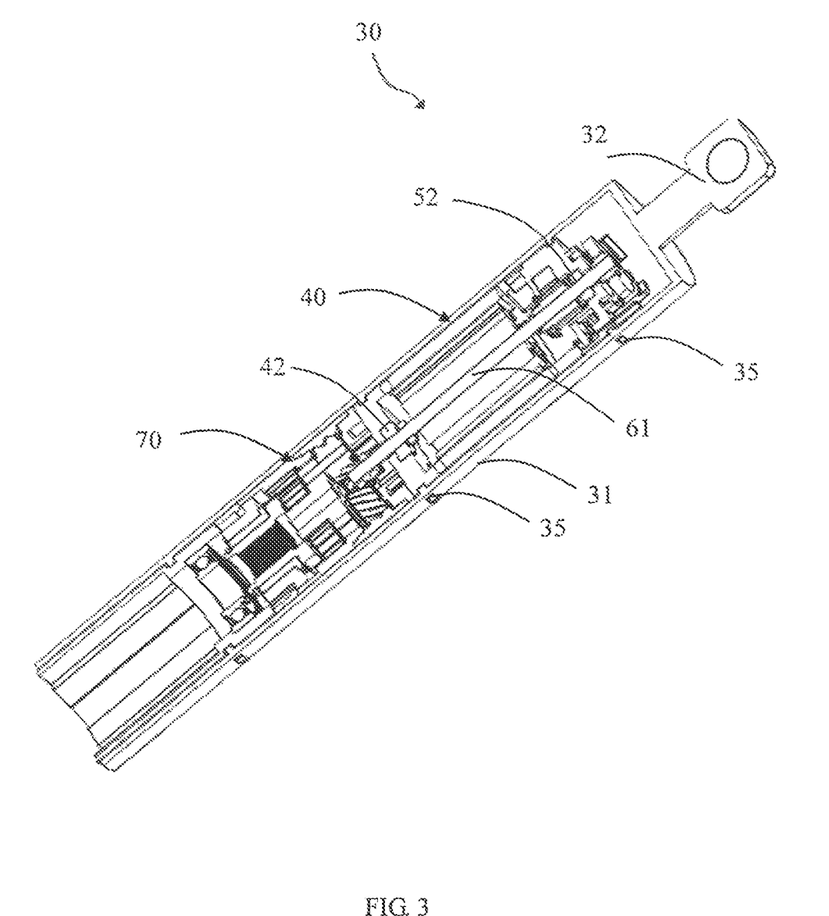
FIG. 3 is a sectional view of a driver of the power strut of FIG. 1.

Referring to FIG. 1 through FIG. 3, a power strut 20 for a lift gate of a vehicle in accordance with the preferred embodiment of the present invention includes a driver 30 and a lead screw device 80 connected to the driver 30. The driver 30 includes a driver sleeve 31, a first connecting head 32 at one end of the driver sleeve 31, and a motor assembly 40 and a gear train or gear reduction mechanism 70 received in the driver sleeve 31. The gear reduction mechanism 70 is connected to the motor assembly 40 to reduce the speed of the motor output while increasing the output torque. The lead screw device 80 includes a lead screw sleeve 81, a second connecting head at one end of the lead screw sleeve 81, a lead screw 84 mounted in the lead screw sleeve 81, and a spring 86. The lead screw 84 is driven by the gear reduction mechanism 70. The lead screw 84 engages with a nut 83 for converting rotation of the lead screw 84 into linear movement of the nut 83. The nut 83 is fixed relative to the second connecting head 82 via a connecting member 85.

The first connecting head 32 is connected to the body of the vehicle, and the second connecting head 82 is connected to the lift gate. As such, as the lead screw 84 is driven by the motor, the second connecting head 82, connecting member 85 and lead screw sleeve 81 extend or retract relative to the first connecting head 32, thus lifting or lowering the lift gate. One end of the spring 86 abuts against the second connecting head 82, and the other end of the spring 86 abuts against an axial distal end of the driver sleeve 31 remote from the first connecting head 32. Alternatively, the one end of the spring 86 may abut against an end wall of the connecting member 85 or the lead screw sleeve 81. When the lift gate is closed, the spring 86 is in a compressed state. As the lead screw 84 drives the second connecting head 82 to extend outward to lift the gate up, the recoil from the spring 86 provides a push force to the second connecting head 82 to support some of the weight of the lift gate to reduce the load on the motor.

In the illustrated embodiment, the gear reduction mechanism 70 is a planetary gear mechanism. In an alternative embodiment, the gear reduction mechanism 70 may be another type of gear reduction mechanism. The planetary reduction mechanism 70 and lead screw device 80 are well known in the art and are therefore not described in further detail.

Figure 4:
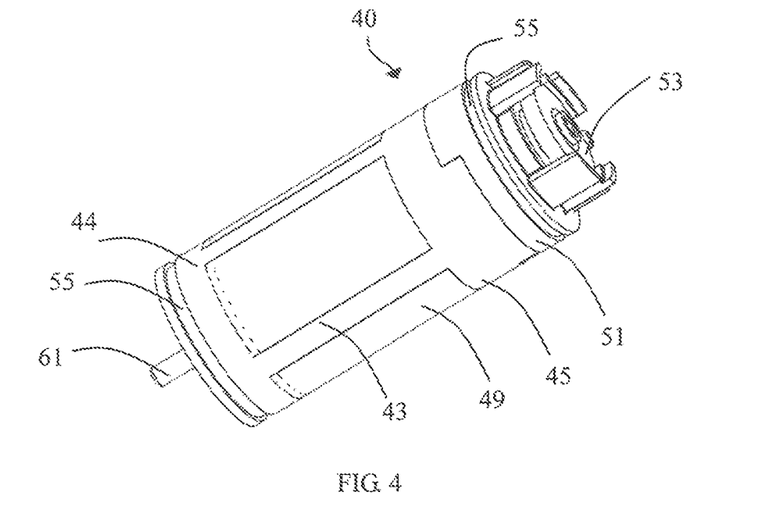
FIG. 4 is a perspective view of a motor assembly of the driver of FIG. 3.
Figure 5:
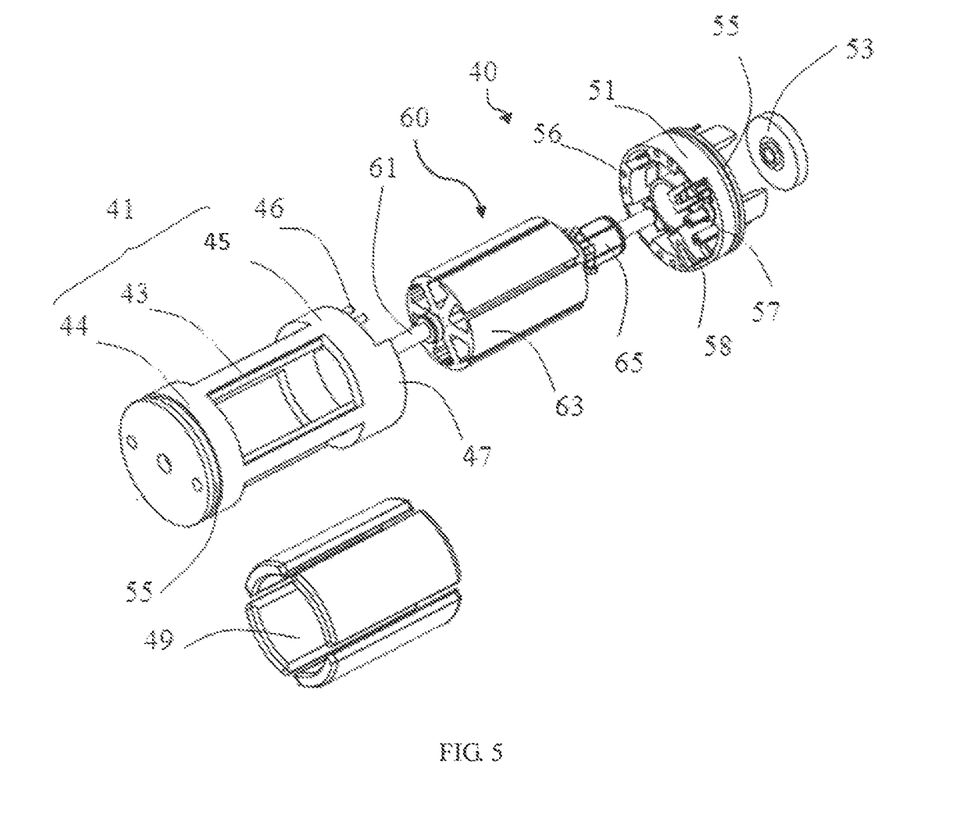
FIG. 5 is an exploded view of the motor assembly of FIG. 4.

Referring to FIGS. 3 to 5, in the present embodiment, the motor assembly 40 includes an integrally formed magnet mounting bracket 41, an end cover 51 and a plurality of permanent magnets 49 mounted to the magnet mounting bracket 41, and a rotor 60.

The magnet mounting bracket 41 is fixed within the driver sleeve 31 and has two annular portions 44, 45 and a plurality of connecting portions 43 connected between the two annular portions 44, 45. The annular portion 44 is substantially closed with a small hole through which the motor shaft 61 extends. The annular portion 45 is substantially open, with a large through hole to allow insertion of the rotor into the mounting bracket 41. The end cover 51 is mounted to the open annular portion 45. A bearing 52 is mounted on the end cover 51. Correspondingly, a bearing 42 (FIG. 3) is mounted on the closed annular portion 44. The motor shaft 61 is journalled in the bearings 42, 52.

Each permanent magnet 49 is held between a corresponding pair of adjacent connecting portions 43 and fits against an inner surface of the driver sleeve 31. The driver sleeve 31 is made of a magnetically conductive material to provide a magnetic path between the magnets 49.

The rotor 60 includes the motor shaft 61, a rotor core 63 and a commutator 65 fixed to the shaft 61, and windings (not shown) wound around the rotor core 63. In assembly of the motor, the rotor core 63 enters the magnet mounting bracket 41 via the open annular portion 45 and is thus disposed surrounded by the permanent magnets 49. Preferably, each magnet is retained between the inner surface of the driver sleeve 31 and circumferential sides of the connecting portions 43, thus preventing the magnets 49 from becoming disengaged from the magnet mounting bracket 41 or coming into direct contact with the rotor core 63. Preferably, the magnets 49 are mounted to the magnet mounting bracket 41 using an insert molding method. It is to be understood, however, that the magnets 49 may be mounted to the magnet mounting bracket after the permanent magnet mounting bracket is integrally formed.

In the present invention, the driver sleeve 31 provides the magnetic path between the magnets 49 which enables the normal operation of the motor. This makes it possible to eliminate the motor housing of the traditional power strut which simplifies the structure and reduces the fabrication cost. In addition, because the motor housing is eliminated, the space available in the driver sleeve is increased, which enables a greater outer diameter of the rotor core, thus allowing the power of the motor to be increased and/or the diameter of the power strut to be decreased. Furthermore, the motor assembly is preassembled prior to being mounted in the driver sleeve, which facilitates storage and transportation of the motor assembly and subsequent assembly of the device.

Preferably, an outer periphery of the end cover 51 forms a recessed mounting portion 55 (FIG. 4). In the illustrated embodiment, the mounting portion 55 is an annular groove. In an alternative embodiment, the mounting portion 55 may be a curved groove extending in a circumferential direction of the end cover 51. Alternatively, the mounting portion may include multiple recessed portions spacingly arranged in the circumferential direction of the driver. The driver sleeve 31 is deformed at locations corresponding to the mounting portion to form protrusions 35 on the inner surface of the driver sleeve 31 that extend into the recessed mounting portion 55, thus preventing movement of the end cover 51 relative to the driver sleeve 31. In the illustrated embodiment, an outer periphery of the closed annular portion 44 also forms a mounting portion 55 for engaging with the driver sleeve 31. This mounting portion 55 is also preferably an annular groove.

Referring to FIG. 5, a brush mounting structure 58 is integrally formed on an inner side (i.e. the side facing the annular portion 45) of the end cover 51. After the motor assembly is assembled, brushes contact the commutator 65 of the rotor. In addition, filtering components of the motor assembly, such as capacitors and/or inductors, may also be mounted to the inner side of the end cover 51 to increase the space utilization which makes the motor assembly more compact.

A ring magnet 53 is disposed on an outer end (the end remote from the annular portion 44) of the motor shaft 61 outside the end cover 51, for cooperating with a sensor to detect the speed of the rotor 60, such that the rotor speed can be controlled by a controller.

Preferably, the annular portion 45 further includes protrusions 46, 47 that axially extend from the magnet mounting bracket 41. The protrusion 46 has a cylindrical shape, and the protrusion 47 has a curve-plate shape. The end cover 51 has corresponding recesses 56, 57 for respectively receiving the protrusions 46, 47 to prevent rotational movement of the end cover 51 relative to the permanent magnet mounting bracket 41. The recess 56 is a hole in shape, and the recess 57 is a notch in shape. Projections 46 are a press fit into recesses 56.

Figure 6:
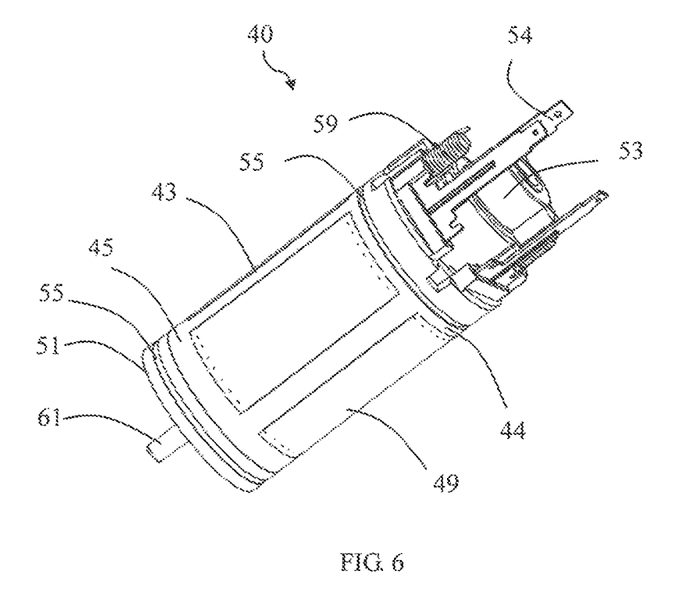
FIG. 6 is a perspective view of a motor assembly of the driver according to another embodiment.
Figure 7:
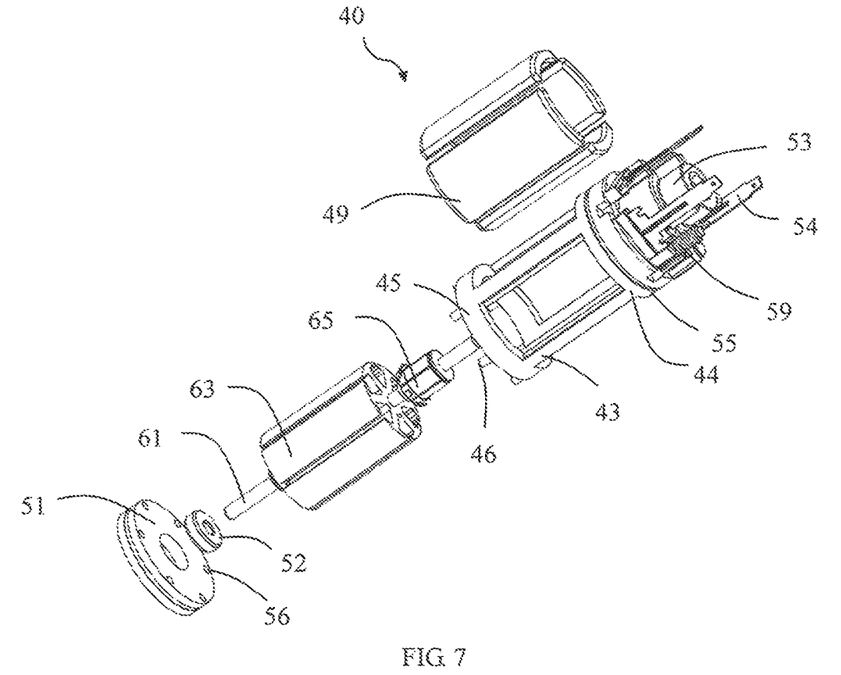
FIG. 7 is an exploded view of the motor assembly of FIG. 6.

FIGS. 6 and 7 illustrate a motor assembly for a power strut according to a second embodiment. In comparison with the motor assembly of FIGS. 4 and 5, the motor assembly of FIGS. 6 and 7 differs in that the end cover 51 fitted to the open annular portion 45 is relatively plain while the closed annular portion 44 supports the motor terminals, the brush gear, the noise filtering components such as capacitors and/or inductors 59, if any, and the sensors for the speed detection circuit. Preferably, the inductor 59 and motor terminals 54 extend in an axial direction of the driver sleeve. In the illustrated embodiment, the end cover 51 supports the bearing 52 and has the recessed mounting portion 55 and a hole through which the shaft 61 extends to engage with the gear reduction mechanism. Projections 46 on the open annular portion 45 engage with recesses 56 in the end cover 51 to couple the end cover to the magnet mounting bracket 41.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A power strut for a vehicle lift gate, comprising: a driver sleeve, a lead screw sleeve, a lead screw and a spring completely mounted within the lead screw sleeve, a gear reduction mechanism mounted in the driver sleeve for driving the lead screw, a motor assembly connected with the gear reduction mechanism and mounted in the driver sleeve, wherein the motor assembly comprises a magnet mounting bracket fixed to the driver sleeve, an end cover and multiple permanent magnets fixed to the magnet mounting bracket, and a rotor rotatably disposed in the magnet mounting bracket, the magnet mounting bracket comprises a closed annular portion, an open annular portion and multiple connecting portions extending between the two annular portions, the open annular portion having a through hole for allowing the rotor to pass there through, the end cover is mounted to the open annular portion, each of the magnets is positioned between a corresponding pair of adjacent connecting portions and contacts an inner surface of the driver sleeve, thereby the driver sleeve provides a magnetic path between the magnets, and the rotor comprises a shaft, and a rotor core and a commutator fixed to the shaft, the rotor core is disposed within the magnet mounting bracket and surrounded by the magnets, and is supported by bearings mounted on the end cover and the closed annular portion, wherein the annular portion comprises protrusions that axially extend from the magnet mounting bracket, one of the protrusions has a cylindrical shape, and another protrusion has a curve-plate shape, the end cover has corresponding recesses for respectively receiving the protrusions to prevent rotational movement of the end cover relative to the permanent magnet mounting bracket, one of the recesses is a hole in shape, and another recess is a notch in shape.

2. The power strut of claim 1, wherein a recessed mounting portion is formed in one of outer peripheries of the magnet mounting bracket and the end cover, and the driver sleeve forms a mounting portion interference-fitting with the recessed mounting portion to prevent relative movement between the magnet mounting bracket and the driver sleeve.

3. The power strut of claim 1, wherein the magnets are fixed to the magnet mounting bracket using an insert molding method.

4. The power strut of claim 1, wherein the open annular portion comprises a protrusion extending in an axial direction, and the end cover comprises a corresponding recess receiving the protrusion to prevent relative movement between the end cover and the magnet mounting bracket.

5. The power strut of claim 1, wherein a brush mounting structure for mounting brushes is integrally formed with the end cover.

6. The power strut of claim 5, wherein the end cover comprises an inductor and power terminals that extend in an axial direction of the driver sleeve.

7. The power strut of claim 1, wherein a brush mounting structure for mounting brushes is integrally formed with the closed annular portion.

8. The power strut of claim 7, wherein the closed annular portion comprises an inductor and motor terminals, both the inductor and the motor terminals extend in an axial direction of the driver sleeve.

9. The power strut of claim 1, wherein each of the magnets is retained against the inner surface of the driver sleeve by circumferential sides of the connecting portions.

10. The power strut of claim 1, further comprising: a first connecting head at one end of the driver sleeve for connecting to a vehicle body, a second connecting head at one end of the lead screw sleeve for connecting to the lift gate, and a nut engaged with the lead screw, the nut being connected to the second connecting head through a connecting member.

11. The power strut of claim 10, wherein one end of the spring abuts against an end of the driver sleeve remote from the first connecting head, and another end of the spring abuts against one of the second connecting head, the connecting member and the lead screw sleeve.

12. The power strut of claim 1, wherein a ring magnet is disposed on an outer end of the motor shaft outside the end cover.

13. The power strut of claim 10, wherein a length of the nut is substantially less than the length of the lead screw sleeve.

14. A power strut for a vehicle lift gate, comprising: a driver sleeve, a lead screw sleeve, a lead screw and a spring mounted in the lead screw sleeve, a gear reduction mechanism mounted in the driver sleeve for driving the lead screw, a motor assembly connected with the gear reduction mechanism and mounted in the driver sleeve, wherein the motor assembly comprises a magnet mounting bracket fixed to the driver sleeve, an end cover and multiple permanent magnets fixed to the magnet mounting bracket, and a rotor rotatably disposed in the magnet mounting bracket, wherein the magnet mounting bracket comprises a closed annular portion, an open annular portion and multiple connecting portions extending between the two annular portions, the open annular portion having a through hole for allowing the rotor to pass there through, the end cover is mounted to the open annular portion, wherein each of the magnets is positioned between a corresponding pair of adjacent connecting portions and contacts an inner surface of the driver sleeve, thereby the driver sleeve provides a magnetic path between the magnets, and wherein the rotor comprises a shaft, and a rotor core and a commutator fixed to the shaft, the rotor core is disposed within the magnet mounting bracket and surrounded by the magnets, and is supported by bearings mounted on the end cover and the closed annular portion, wherein the annular portion comprises protrusions that axially extend from the magnet mounting bracket, one of the protrusions has a cylindrical shape, and another protrusion has a curve-plate shape, the end cover has corresponding recesses for respectively receiving the protrusions to prevent rotational movement of the end cover relative to the permanent magnet mounting bracket, one of the recesses is a hole in shape, and another recess is a notch in shape.

* * * * *